United States Patent
Gaur et al.

(10) Patent No.: US 10,853,782 B2
(45) Date of Patent: Dec. 1, 2020

(54) SYSTEM AND METHOD FOR VENDING DEVICE INVENTORY MANAGEMENT

(71) Applicant: VENDEKIN TECHNOLOGIES PRIVATE LIMITED, Maharashtra (IN)

(72) Inventors: Anshoo Gaur, Naperville, IL (US); Aroon Ashish Khatter, Dover, DE (US)

(73) Assignee: VENDEKIN TECHNOLOGIES PRIVATE LIMITED (IN)

(*) Notice: Subject to any disclaimer, the term of this patent is extended or adjusted under 35 U.S.C. 154(b) by 358 days.

(21) Appl. No.: 15/662,342

(22) Filed: Jul. 28, 2017

(65) Prior Publication Data
US 2018/0300681 A1 Oct. 18, 2018

(30) Foreign Application Priority Data
Apr. 14, 2017 (IN) .............................. 201721013408

(51) Int. Cl.
| | |
|---|---|
| *G06Q 10/08* | (2012.01) |
| *G06Q 20/18* | (2012.01) |
| *G06Q 30/06* | (2012.01) |
| *H04W 4/80* | (2018.01) |

(Continued)

(52) U.S. Cl.
CPC ......... *G06Q 20/203* (2013.01); *G06Q 10/087* (2013.01); *G06Q 20/18* (2013.01); *G06Q 20/327* (2013.01); *G06Q 30/0631* (2013.01); *G06Q 30/0643* (2013.01); *H04W 4/80* (2018.02); *G06Q 10/0875* (2013.01)

(58) Field of Classification Search
CPC .............................. G06Q 10/087; G06Q 50/28

USPC ................................. 700/231, 232, 233, 234
See application file for complete search history.

(56) References Cited

U.S. PATENT DOCUMENTS

| | | | |
|---|---|---|---|
| 7,218,991 B2* | 5/2007 | Walker | G06Q 20/10 700/232 |
| 8,189,855 B2* | 5/2012 | Opalach | G06K 9/00201 382/100 |
| 8,321,302 B2 | 11/2012 | Bauer et al. | |

(Continued)

OTHER PUBLICATIONS

Johannes Rietschel, "What is an MDB and how is it integrated in vending machines?", Apr. 7, 2017, QIBIXX (Year: 2017).*

*Primary Examiner* — Florian M Zeender
*Assistant Examiner* — Vanessa Deligi
(74) *Attorney, Agent, or Firm* — Dilworth IP, LLC

(57) ABSTRACT

A system and method for vending device inventory management is disclosed. The system and method may enable receiving vending data from a processing unit retrofitted with a vending machine controller (VMC) of a vending device. The vending data may be associated with one of a cash transaction or a cashless transaction. The system and method may enable analysing the vending data. The system and method may enable updating an inventory associated with the vending device and recommending a product or combination of products for refilling of the vending device based upon analysis of the vending data. The system and method may enable generating an updated planogram based on the updated inventory. The system and method may further enable displaying an updated planogram along with the product or combination of products recommended on a user device for enabling the user to refill the one or more products in the vending device.

14 Claims, 7 Drawing Sheets

(51) Int. Cl.
    *G06Q 20/32*     (2012.01)
    *G06Q 20/20*     (2012.01)

(56) References Cited

U.S. PATENT DOCUMENTS

| | | | |
|---|---|---|---|
| 9,256,873 B2* | 2/2016 | Patel | G06Q 20/3829 |
| 2003/0154141 A1 | 8/2003 | Capazario et al. | |
| 2008/0249658 A1* | 10/2008 | Walker | G07F 9/02 |
| | | | 700/236 |
| 2009/0306819 A1* | 12/2009 | Insolia | G07F 9/002 |
| | | | 700/232 |
| 2011/0172814 A1* | 7/2011 | Breitenbach | B67D 7/145 |
| | | | 700/232 |
| 2013/0144432 A1* | 6/2013 | Canter | G07F 9/026 |
| | | | 700/236 |
| 2014/0089077 A1* | 3/2014 | Zuckerman | G07F 9/026 |
| | | | 705/14.37 |
| 2014/0358705 A1* | 12/2014 | Harrington | G06Q 30/0623 |
| | | | 705/16 |
| 2015/0235202 A1* | 8/2015 | Zabala | G06Q 20/327 |
| | | | 700/232 |
| 2015/0324725 A1* | 11/2015 | Roesbery | G06Q 10/06393 |
| | | | 705/7.39 |
| 2015/0339621 A1* | 11/2015 | Hewett | G06Q 10/087 |
| | | | 705/28 |
| 2016/0005020 A1* | 1/2016 | Fernando | G06F 3/048 |
| | | | 705/21 |
| 2017/0345247 A1* | 11/2017 | Torresani | G06Q 10/087 |
| 2018/0096554 A1* | 4/2018 | Hough | G07F 9/026 |
| 2018/0096555 A1* | 4/2018 | Schtein | G07F 9/026 |

\* cited by examiner

SYSTEM AND METHOD FOR VENDING DEVICE INVENTORY MANAGEMENT

CROSS-REFERENCE TO RELATED APPLICATIONS AND PRIORITY

The present application claims priority from Indian Provisional Patent Application No. 201721013408 filed on 14 Apr. 2017 which is incorporated herein by a reference.

TECHNICAL FIELD

The present invention in general relates to a system and method for vending device inventory management.

BACKGROUND

Vending device enables dispensing products or items such as snacks, beverages, tickets to the customers automatically once the customer inserts currency coins or notes into the said vending device. Such devices typically contain a number of different products from which the consumer may choose a desired product to be vend by the vending device. After inserting the appropriate amount of money into the vending device and entering a product selection, the selected goods are dispensed to the consumer. Various vending devices are usually installed in airports, railway stations, pubs, café s, shopping malls, other publicly accessible buildings and streets to provide easy access to the users.

Conventionally, most of the work required for maintenance, monitoring health status and inventory management of the vending devices is done manually. Further, Vending device operators face tight competition, changing consumer preferences, making it vitally important to improve efficiency in inventory management, stocking schedules and routes, and equipment repair and maintenance. Therefore, there is long standing need of system and method for vending device inventory management to improve efficiency of the vending device.

SUMMARY

Before the present system and its method of use is described, it is to be understood that this disclosure is not limited to the particular apparatus and its arrangement as described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is not intended to identify essential features of the subject matter nor it is intended for use in detecting or limiting the scope of the proposed subject matter.

In one embodiment, a system for vending device inventory management is disclosed. The system may comprise a processor and a memory coupled with the processor. The processor may be configured to execute programmed instructions stored in the memory. In one aspect, the processor may execute instructions for receiving vending data from a processing unit retrofitted with a vending machine controller (VMC) of a vending device. The vending data is associated with one of a cash transaction or a cashless transaction. The vending data associated to the cashless transaction may be captured by the processing unit via the user device, communicatively coupled with the processor, facilitating the said cashless transaction. Further, the vending data associated to the cash transaction may be captured by tapping the cash transaction facilitated through either of the VMC or the processing unit. The processor may execute instructions for analysing the vending data in order to determine a list of one or more products successfully dispensed from the vending device and a list of one or more products failed from being dispensed from the vending device. The processor may execute instructions for updating an inventory associated with the vending device and recommending a product or combination of products for refilling of the vending device based upon analysis of the vending data. The processor may execute instructions for generating an updated planogram based on the updated inventory. The processor may execute instructions for displaying an updated planogram along with the product or combination of products recommended on a user device associated to a user for enabling the user to refill the one or more products in the vending device.

In another embodiment, a method for vending device inventory management is disclosed. The method may comprise receiving, via a processor, vending data from a processing unit. In one aspect, the vending data is associated with one of a cash transaction or a cashless transaction. The vending data associated to the cashless transaction may be captured by the processing unit via the user device, communicatively coupled with the processor, facilitating the said cashless transaction. Further, the vending data associated to the cash transaction may be captured by tapping the cash transaction facilitated either through the VMC or the processing unit. The method may comprise analysing, via the processor, the vending data in order to determine a list of one or more products successfully dispensed from the vending device and a list of one or more products failed from being dispensed from the vending device. The method may comprise updating, via the processor, an inventory associated with the vending device and recommending a product or combination of products for refilling of the vending device based upon analysis of the vending data. The method may comprise displaying, via the processor, an updated planogram along with the product or combination of products recommended on a user device associated to a user for enabling the user to refill the one or more products in the vending device.

BRIEF DESCRIPTION OF DRAWINGS

The detailed description is described with reference to the accompanying Figures. In the Figures, the left-most digit(s) of a reference number identifies the Figure in which the reference number first appears. The same numbers are used throughout the drawings to refer like features and components.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that, the singular forms "a," "an," and "the" include plural references unless the context clearly dictates otherwise. Although any methods similar or equivalent to those described herein can be used in the practice or testing of embodiments of the present disclosure, the exemplary methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

Though the below description, in conjunction with the drawings, has been described considering the vending device as a vending machine, however, the present disclosure is not necessarily limited to the vending machine as described below and the vending device herein may include any unmanned device that may be used for dispensing any product or service.

Figure 1:
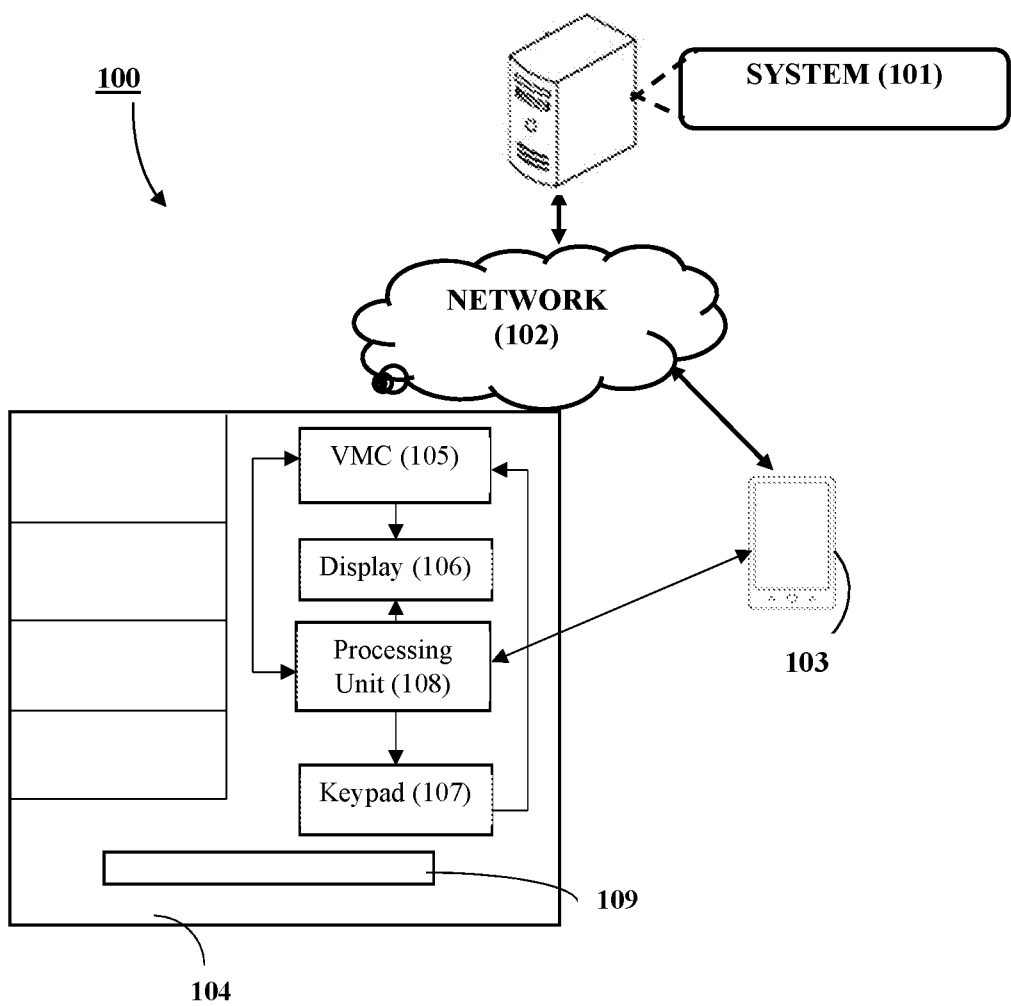
FIG. 1 illustrates an implementation 100 of a system 101 for vending device inventory management, in accordance with an embodiment of the present subject matter.

Referring to FIG. 1, a network implementation 100 of a system 101 for vending device inventory management is illustrated, in accordance with an embodiment of the present subject matter. As shown in FIG. 1, a vending device 104 may be provided. The vending device may further comprise a vending machine controller (VMC) 105 (to be referred as VMC 105 hereinafter), a display 106, a keypad 107 and a processing unit 108. The processing unit 108 may be communicatively coupled with a user device 103 (either a consumer device or an operator device). The consumer device indicates the user device 103 associated with a consumer of the one or more products associated with the vending device 104. The operator device indicates the user device 103 associated the operator of the vending device, wherein such operator is responsible for maintenance, monitoring health status and inventory management of the vending device 104. Hereinafter, the user device 103 associated with the operator and the consumer will be interchangeably referred as an operator device 103 and a consumer device 103 respectively. In one embodiment, the processing unit 108 may be electronically coupled with the display 106, the keypad 107 and the VMC 105. In one embodiment, the processing unit 108 may communicate with the user device 103 through a wireless communication protocol selected from a group comprising, but not limited to, Bluetooth communication protocol, Near Field Communication (NFC), Radio Frequency (RF) protocol, an infra-red (IR) protocol, ZigBee protocol and the like. In another embodiment, the processing unit 108 may communicate with the user device 103 through a router (not shown) present within the vending device 104. Further, the user device 103 may be communicatively coupled with the system 101.

Although the present subject matter is explained considering that the system 101 is implemented as on a server, it may be understood that the system 101 may also be implemented in a variety of computing systems, such as a laptop computer, a desktop computer, a notebook, a workstation, a mainframe computer, a server, a network server, and the like. It will be understood that the system 101 may be accessed by multiple operator's through one or more operator devices 103-1, 103-2 . . . 103-N, collectively referred to as user device 103 hereinafter, or applications residing on the user devices 103. Examples of the user devices 103 may include, but are not limited to, a portable computer, a personal digital assistant, a handheld device, and a workstation. The operator devices 103 are communicatively coupled to the system 101 through a network 102.

In one implementation, the network 102 may be a wireless network, a wired network or a combination thereof. The network 102 can be accessed by the operator device 104 using wired or wireless network connectivity means including updated communications technology. The network 102 can be implemented as one of the different types of networks, such as intranet, local area network (LAN), wide area network (WAN), the internet, and the like. The network 102 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 102 may include a variety of network devices, including routers, bridges, servers, computing devices, storage devices, and the like.

In one embodiment, the system 101 may be configured to receive the vending data from the processing unit 108. In one embodiment, the vending data may be associated with one of a cash transaction or a cashless transaction. In one embodiment, the vending data associated to the cashless transaction may be captured by the processing unit 108 via the user device 103. Further, the processing unit 108 may be configured to facilitate the cashless transaction. In one embodiment, the vending data associated to the cash transaction may be captured by tapping the cash transaction facilitated through the VMC.

In one embodiment, the processing unit 108 may communicate with the operator device 103 using a wireless communication protocol such as a short-range communication protocol selected from a group comprising, Bluetooth communication protocol, Near Field Communication (NFC), Radio Frequency (RF) protocol, an infra-red (IR) protocol, ZigBee protocol, and the like. In another embodiment, the e processing unit 108 may communicate with the operator device 103 via a router in the vending device 104. In one embodiment, the operator device 103 may be configured to perform auto-pairing of the user device 103 with the vending device 104 by scanning of the QR code displayed on the vending device 104.

In one embodiment, the system 101 may be configured to identify the vending device 104 within a predefined range of the location of the operator device 103. In one embodiment, the system 101 may be configured to enable the operator to scan, via the operator device 103, a QR code displayed on the vending device 104. In one embodiment, the QR code comprises details of the vending device 104 in order to perform verification of the identified vending device 104. In one embodiment, the system 101 implemented on the user device 103 may enable the operator to communicate with the vending device 104. In one embodiment, the operator device 103 may display products available in the vending device 104.

In one embodiment, the system 101 may be configured to analyse the vending data in order to determine a list of one or more products successfully dispensed from the vending device and a list of one or more products failed from being dispensed from the vending device. In one embodiment, the system 101 may be configured to analyse the vending data in order to determine the list of one or more products successfully dispensed from the vending device as well as the list of one or more products failed from being dispensed from the vending device corresponding to one or more coin/currency transactions and/or one or more cashless transactions.

In one embodiment, the system 101 may be configured to update inventory associated with the vending device based upon analysis of the vending data. In one embodiment, the system 101 may be configured to recommend a product or combination of products for refilling of the vending device based upon analysis of the vending data. In one embodiment, the system 101 may be configured to generate an updated planogram based on the updated inventory.

In one embodiment, the system 101 may be configured to display updated planogram along with the product or combination of products recommended on an operator device 103. In one embodiment, the planogram of the vending device may indicate a virtual image of number and arrangement of the all products in the shelves, racks or trays. In one embodiment, the updated planogram and recommendations may be used to refill the one or more products in the vending device. In one embodiment, the system 101 may enable the operator to refill the products at the empty shelves, racks or trays by displaying updated planogram.

In one embodiment, the system 101 may enable the operator device 103 to capture an image of the vending device 104 after refilling of the vending device in order to update the inventory.

In another embodiment, the vending device 104 may further comprise one or more sensors (not shown) to detect number of products available in the shelves, racks or trays. The processing unit 108 may be configured to capture vending data and store the vending data. In one embodiment, the system 101 may be configured to display planogram to the operator, wherein the planogram is generated using analysis of vending data.

In one embodiment, the system 101 may update the available products in the inventory through the operator device 103. In one embodiment, the system 101 may enable an operator to refill the products at the empty shelves, racks or trays. In one embodiment, the system 101 may provide recommendations to the operator based on the analysis of the prior dispensed products. In one exemplary embodiment, the system 101 may recommend the operator to refill a shelve with a soft-drink of a particular brand based on the more number of historical dispenses for this particular soft drink as compared to other product(s). In one embodiment, the system 101 may recommend the operator with combination of the products in the vending device to improve the sales in the future.

In one embodiment, the system 101 may enable the operator to maintain/monitor status/health of the vending device. In one embodiment, the system 101 may enable initiating a refund for failure of dispensing of products via the vending device. In one embodiment, the one or more sensors of the vending device may be configured to detect failure in dispensing unit and accordingly update the vending data store in processing unit 108. Further, the vending data may be used for initiating the refund activity. Further, the system 101 may track the vending data and if it is determined that there is continuous failure of a particular product through a particular tray or a rack, the system 101 may send an alert to the operator to check and diagnose the components dispensing the particular product or change/replace the product itself on the said tray/rack.

In one embodiment, the system 101 may provide maintenance list of all vending devices, in the allotted area to the operator or within predefined range from the location of the operator device. In one embodiment, the system 101 may update the operator with maintenance status of the all vending device in the area allotted.

In one embodiment, the system 101 may enable the operator to broadcast the message on the display of the vending device.

Figure 2:
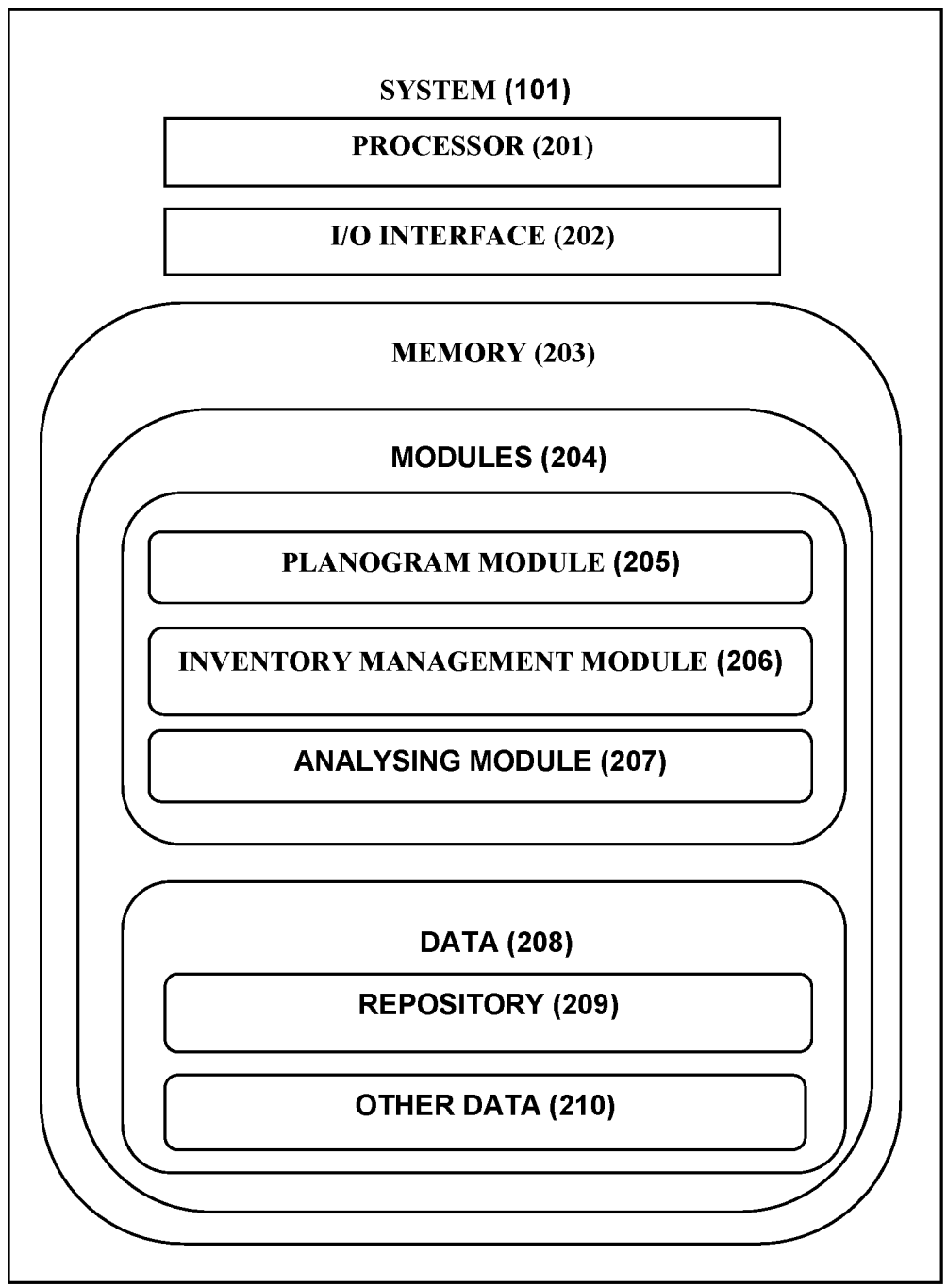
FIG. 2 illustrates the system 101 and components of the system 101, in accordance with the embodiment of the present subject matter.

Now referring to FIG. 2, components of the system 101 are illustrated in accordance with an embodiment of the present subject matter. The system 101 may comprise at least one processor 201, an input/output (I/O) interface 202, a memory 203, modules 204 and data 208. In one embodiment, the at least one processor 201 is configured to fetch and execute computer-readable instructions stored in the memory 203.

In one embodiment, the I/O interface 202 may include a variety of software and hardware interfaces, for example, a web interface, a graphical user interface, and the like. The I/O interface 202 may allow the system 101 to interact with the operator devices 103. Further, the I/O interface 202 may enable the operator device 103 to communicate with other computing devices, such as web servers and external data servers (not shown). The I/O interface 202 can facilitate multiple communications within a wide variety of networks and protocol types, including wired networks, for example, LAN, cable, etc., and wireless networks, such as WLAN, cellular, or satellite. The I/O interface 202 may include one or more ports for connecting to another server.

In an implementation, the memory 203 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and memory cards. The memory 203 may include modules 204 and data 208.

The modules include routines, programs, objects, components, data structures, etc., which perform particular tasks, functions or implement particular abstract data types. In one implementation, the modules may include a planogram module 205, an inventory management module 206, an analysing module 207 and other modules (not shown in figure). The other modules may include programs or coded instructions that supplement applications and functions of the user device.

In one embodiment, the data 208 may comprise repository 209 and other data 210. In one exemplary embodiment, the repository 209 may be configured to store data processed, received, and generated by one or more of the modules 204. In one exemplary embodiment, the repository 209 may store list of the vending devices, identifiers & MAC addresses of each vending device as-well-as list of all products available in each vending device. The other data 210 may include data generated as a result of the execution of one or more modules.

In one implementation, an operator may use the operator device 103 to register with the system 101 via I/O interface 202. The operator may use an application installed on the operator device 103 in order to register with the system 101.

In one embodiment, the system 101 may be configured to receive the vending data from a processing unit 108. In one embodiment, the vending data may be associated with a cash transaction or a cashless transaction. In one embodiment, the vending data associated to the cashless transaction may be captured by the processing unit 108 via the consumer device 103 coupled with the processing unit 108. Further, the processing unit 108 may be configured to facilitate the cashless transaction through the consumer device 103. In one embodiment, the vending data associated to the cash transaction may be captured by tapping the cash transaction facilitated through the VMC 105. The tapped cash transaction may be updated to the system 101 through the consumer device 103 facilitating the subsequent electronic/cashless transaction associated with the vending device 104.

In one embodiment, the user device 103 may be communicatively coupled with the processing unit 108 of vending device 104. In one embodiment, the processing unit 108 may be communicatively coupled with the user device 103 using a wireless communication protocol such as a short-range communication protocol selected from a group comprising, Bluetooth communication protocol, Near Field Communication (NFC), Radio Frequency (RF) protocol, an infra-red (IR) protocol, ZigBee protocol. In one embodiment, the user device 103 may be configured to perform auto-pairing by scanning of the QR code displayed on the vending device 104.

In one embodiment, the system 101 may be configured to identify the vending device 104 within predefined range from the location of the user device 103 in order to receive the vending data. In one embodiment, the system 101 may be configured to identify the vending devices 104 from a list of vending devices stored in the repository 209 of the system 101. In one embodiment, the system 101 may be configured to receive the vending data from the processing unit 108 of the vending device 104 through the user device 103. In one embodiment, the user device 103 may be auto-paired with the processing unit 108 of vending device. In one embodiment, the user device 103 may be configured to perform auto-pairing by scanning of the QR code displayed on the vending device.

In another embodiment, the user device 103 may perform auto-pairing with the vending device by auto-polling of the vending devices in the predefined range of the user device. Specifically, the user device 103 may initiate auto-polling of the vending devices within the predefined range of the user device and thereby display the list of vending devices on a display screen of the user device 103 identified as a result of the auto-polling technique. The user may select a vending device from the list of vending devices displayed for enabling the auto-pairing of the user device 103 with the vending device selected. In yet another embodiment, the user device 103 may perform auto-pairing with the vending device using one or more tactile inputs, gesture inputs, and voice commands received from the user either via the user device or the vending device or both. In still another embodiment, the user device 103 may perform auto-pairing with the vending device having geospatial data (latitude or longitude or both) closely matching with the geospatial data of the user device 103.

Now referring to FIG. 2, the analysing module 207 may be configured to analyse the vending data. The vending data may be analysed in order to determine a list of one or more products successfully dispensed from the vending device and a list of one or more products failed from being dispensed from the vending device. Further, the analysing module 207 may be configured to maintain a log file of the vending data for the refund activities as-well-as number of instances of failure of dispensing products for cashless transactions. Further, the analysing module 207 may track the vending data in the log file and if it is determined that there is continuous failure of a particular product through a particular tray or a rack, the system 101 may send an alert to the operator to check and diagnose the components dispensing the particular product or change/replace the product itself on the said tray/rack.

In one embodiment, the inventory management module 206 may be configured to update the list of available products in the vending device based on the analysis performed by the analysing module 207. In one embodiment, the vending device 105 may comprise one or more sensors to detect number of products available in the shelves, racks or trays. In one embodiment, the one or more sensors of the vending device may be configured to detect failure in dispensing unit and accordingly update the vending data. In one embodiment, the vending data is associated with at least one of a cash transaction or a cashless transaction. In one embodiment, the vending data may be stored in the processing unit 108 of the vending device 104. Further, the vending data may be transmitted to the user device 103 in order to update inventory using the wireless communication protocol selected from a group comprising, but not limited to, Bluetooth communication protocol, Near Field Communication (NFC), Radio Frequency (RF) protocol, an infra-red (IR) protocol, ZigBee protocol and the like.

In one embodiment, the analysing module 207 may provide recommendations to the operator based on the analysis of the list of prior dispensed products. In one exemplary embodiment, the system 101 may recommend the operator to refill a shelve with a soft-drink of a particular brand based on the number of historical dispenses for this particular soft drink as compared to other product(s). In one embodiment, the system 101 may recommend the operator combination of the products in the vending device 104 to improve the sales in the future.

In one embodiment, the planogram module 205 may be configured to display the updated planogram of the vending device to the operator. In one embodiment, the planogram of the vending device may indicate a virtual image of number and arrangement of the all products in the shelves, racks or trays. In one embodiment, the planogram module 205 may generate planograms of the vending device based on analysis of vending data. The processing unit 108, of the vending device 104 may be configured to generate and store the vending data. In one embodiment, the planogram may be used by the operator to refill the vending device.

In one embodiment, the inventory management module 206 may be configured to update the inventory based upon details of the dispensed products and the previous transactions associated with the vending data. In one embodiment, the inventory management module 206 may deduct/remove the dispensed product from the inventory. In one embodiment, the VMC 105 may be configured to dispense a product after insertion of coin or notes into the vending device. The VMC 105 may receive money (credit) through a protocol including, but not limited to, an MDB protocol, a VCCs protocol, and BDV protocol. Further, based upon the credit received, the VMC 105 releases keypad which may enable the user/consumer to press buttons on the keypad in order to select product of choice. In one embodiment, the processing unit 108 may recognize the product selection based upon pressing of the keypad. In such instance, updating of the inventory may be performed when the next consumer who approaches the vending device and executes an online/cashless transaction via the system 101. The processing unit 108 may be configured to transmit the previously selected product details to the system 101. Further, the inventory management module 206 of the system 101 may deduct/remove historical selected product(s) by the previous consumers from the inventory in order to update the inventory.

In one embodiment, the VMC 105 may be configured to dispense a product after insertion of coin or notes into the vending device. In one embodiment, the VMC 105 may freeze the keypad until the cash credit is received. After receiving the cash credit, the VMC 105 releases the keypad in order to enable user/consumer to select product from vending device. In one embodiment, the VMC 105 is electronically coupled with the processing unit 108. The processing unit 108 may be configured to store the details of cash transactions which are further transmitted to the user device in order to update the inventory at the time of cashless transactions. In one exemplary embodiment, the processing unit 108 may be configured to store five cash transaction.

In another embodiment, the processing unit may comprise a Subscriber Identity Module (SIM) in order to directly transmit details of cash transactions to update the inventory.

In one embodiment, the system 101 may be configured to accept voice commands from the user. In one exemplary embodiment, based upon the auto-pairing of the vending device with the user device, a planogram is displayed on the user device. The operator may give vocal command to the user device which contains refill information in a pre-decided sequence (For Ex. 'A5 Coke 10'). The system 101 may be configured to understand the commands and enters data into the planogram. Thereafter, the operator gets confirmation screen based on the data received by the system 101. In one embodiment, the user device and vending device may also provide an audio assistance at the time of refilling. In some embodiments, the user device and the vending device may enable the user to interact with either of the user device or the vending device through tactile inputs. In some embodiments, the user device and vending device may be configured to interact with the user through gesture control mechanism.

Figure 3:
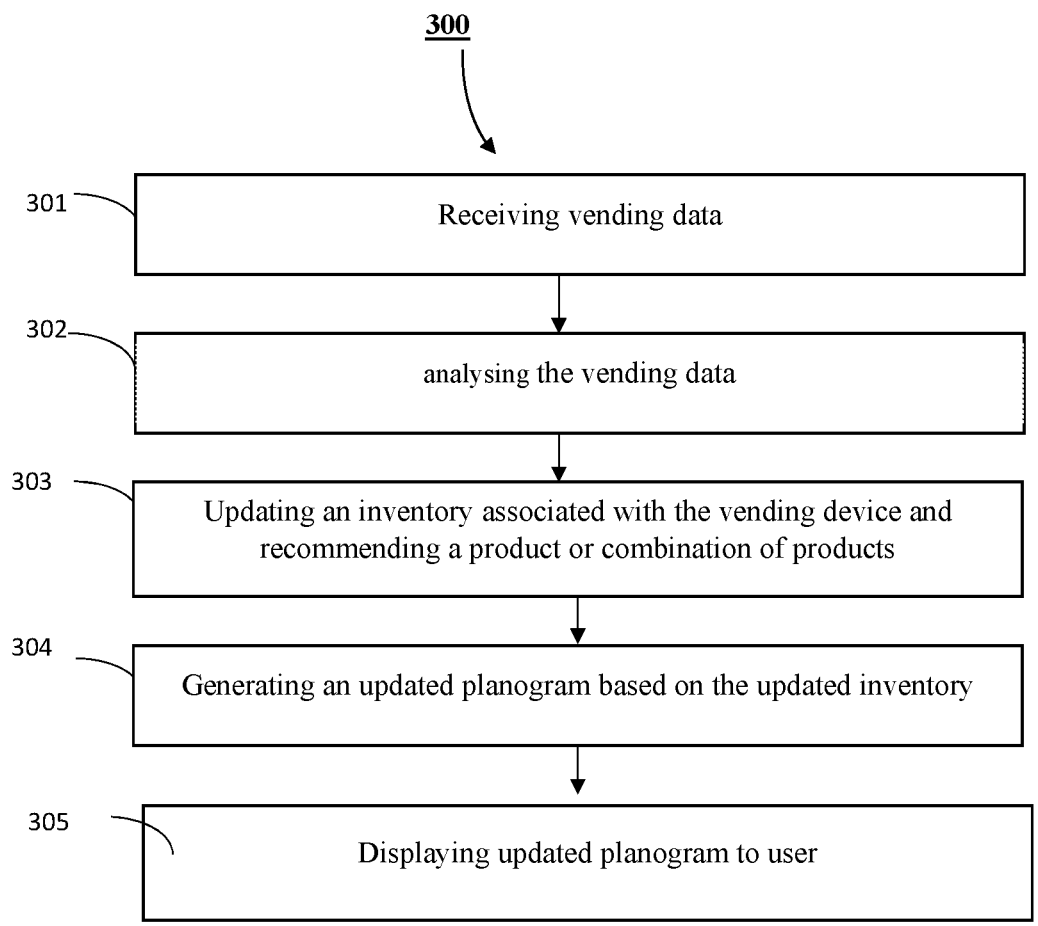
FIG. 3 illustrates a method 300 for vending device inventory management, in accordance with an embodiment of the present subject matter.

Referring to FIG. 3, a method for vending device inventory management is illustrated, in accordance with an embodiment of the present subject matter.

As shown, at step 301, the system 101 may be configured to receive the vending data from the processing unit 108 of the vending device. In one embodiment, the vending data is associated with one of a cash transaction or a cashless transaction. In one embodiment, the system 101 may receive vending data after identifying a vending device 104 within a predefined range of the location of the user device 103. In one embodiment, the system 101 may enable the operator to select vending device from the list of the vending devices stored in the database. In one embodiment, the system 101 may suggest the vending device to the operator based on the location of the operator device 103. In one embodiment, the location of the operator device may be tracked by the system 101 via the GPS module present within the operator device 103.

In one embodiment, the user device 103 may enable user to scan a QR code displayed on the vending device 104. The device 103 may enable the operator to communicate with the vending device 104. In one embodiment, the operator device 103 may display products available in the vending device 104. In one embodiment, the operator device 103 may communicate with the vending device 104 by auto pairing of the operator device 103 with the processing unit 108 through the wireless communication protocol.

At step 302, the analysing module 207 may be configured to analyse vending data in order to determine a list of one or more products successfully dispensed from the vending device and a list of one or more products failed from being dispensed from the vending device. In one embodiment, the analysing module 207 may be further configured to track the vending data stored in the log file to determine if there is continuous failure of a particular product through a particular tray or a rack. In such scenario, the system 101 may generate and send an alert to the operator to check and diagnose the components dispensing the particular product or change/replace the product itself on the said tray/rack.

At step 303, the inventory management module 206 may be configured to update the inventory and recommending a product or combination of products for refilling of the vending device based upon analysis of the vending data. In one embodiment, the system 101 may recommend the operator the combination of the products in the vending device to improve the sales in the future.

At step 304, the planogram module 205 may be configured to generate updated planogram based on the updated inventory information.

At step 305, the planogram module 205 may be configured to display updated planogram along with the product or combination of products recommended on a user device associated to a user for enabling the user to refill the one or more products in the vending device.

Figure 4:
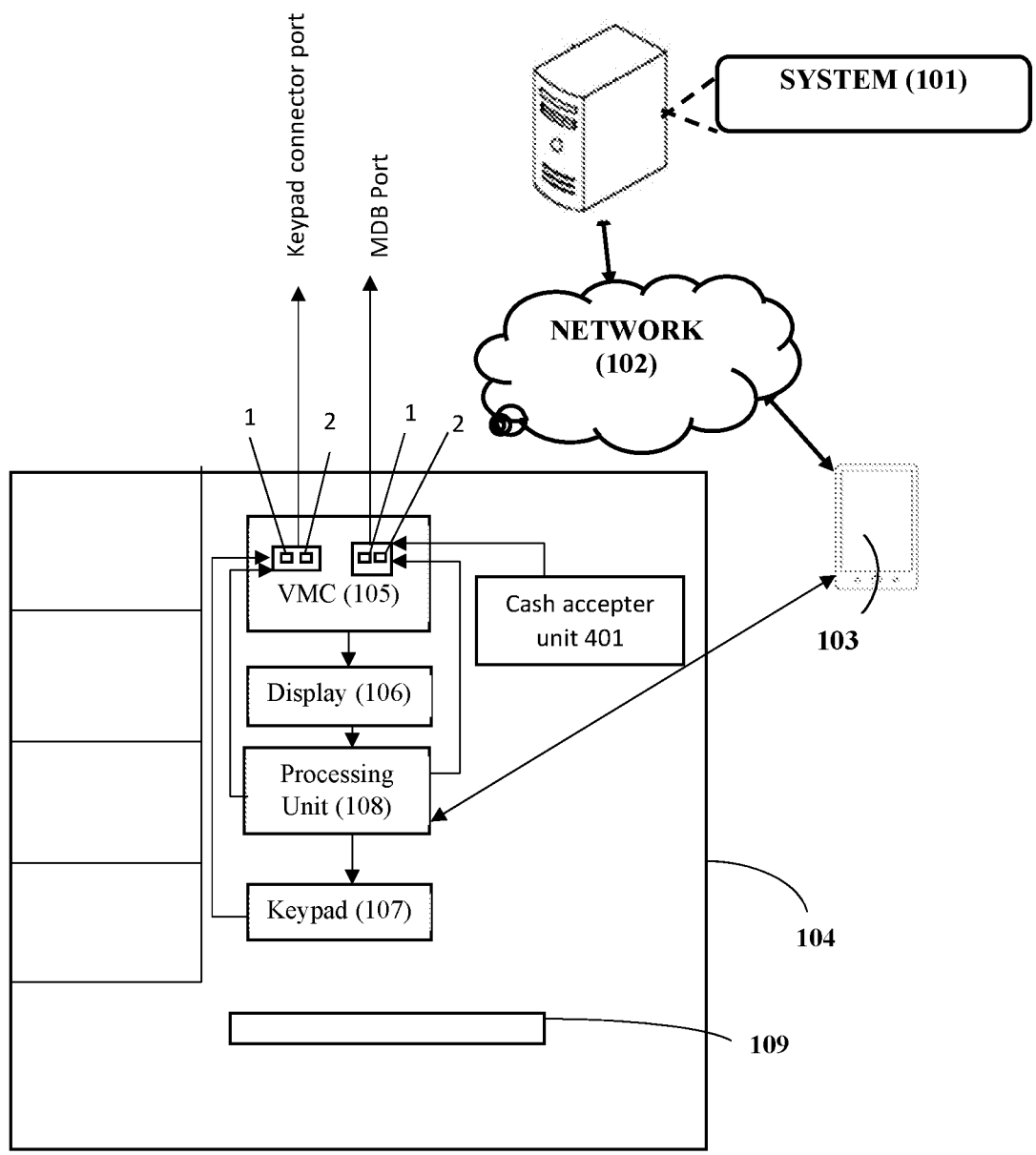
FIG. 4 illustrates an example of cash acceptor vending device inventory management, in accordance with an embodiment of the present subject matter.

Now referring to FIG. 4, an example of cash acceptor vending device inventory management is illustrated. In one embodiment, a cash acceptor unit 401 may be connected to the VMC 105 through an MDB port-1. In one embodiment, the keypad 107 may be electronically coupled with the VMC 105 via a keypad connector port-1 to tap vending data received from the user. In one embodiment, the VMC 105 may freeze the keypad until the cash credit is received. After receiving the cash credit, the VMC 105 may release the keypad in order to enable the user/consumer to select product from vending device 104. In one embodiment, the processing unit 108 may tap the vending data through the keypad connector port-2 of the VMC 105. In one exemplary embodiment, the VMC 105 may be configured to perform tapping of the signal received from the keypad. In some embodiments, the VMC may not be configured to perform tapping of the signal received from the keypad 107. In such cases, the keypad 107 may comprise a thin film of silicone (not shown in the FIG. 4) behind the keypad in order to provide signal for tapping. The processing unit 108 may be configured to tap the signal from thin film of silicone behind the keypad 107. In one embodiment, the processing unit 108 may be configured to update the inventory using tapped vending data stored in the processing unit 108, at the time of subsequent electronic/cashless transaction associated with the vending device through the consumer device or the operator device.

Figure 5:
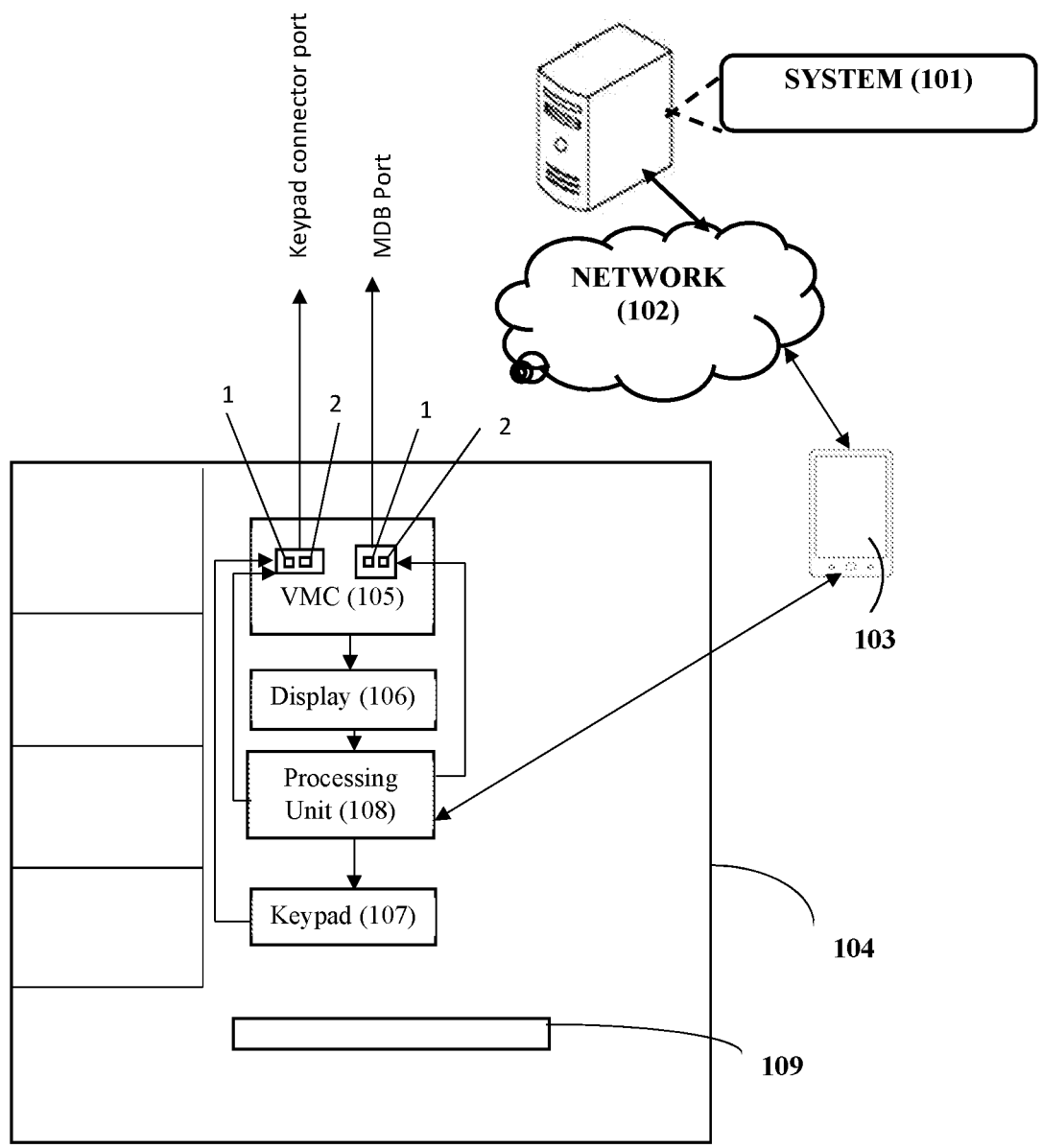
FIG. 5 illustrates an example of inventory management for cashless payment, in accordance with an embodiment of the present subject matter.

Now referring to FIG. 5, an example of inventory management for cashless payment is illustrated. In one embodiment, the keypad 107 may be electronically coupled with the VMC 105 via a keypad connector port-1 in order to receive vending data from the user. In one embodiment, the VMC 105 may freeze the keypad until the cashless payment is received. After receiving the cashless payment, the VMC 105 may release the keypad in order to enable user/consumer to select product from vending device 104. In another embodiment, the processing unit 108 may auto-press the keys of the keypad to autonomously select the product to be dispensed from the vending device 104 without requiring any input from the user for selecting the product. In one embodiment, the processing unit 108 may tap the vending data through the keypad connector port-2 of the VMC 105. In another embodiment, the processing unit 108 may tap the vending data from the keypad wherein, the keypad 107 may be connected to the processing unit 108 through the keypad connector port. Further, the processing unit 108 may be configured to update the inventory using tapped vending data stored in the processing unit 108, at the time of subsequent electronic/cashless transaction associated with the vending device through the consumer device 103 or the operator device.

Figure 6:
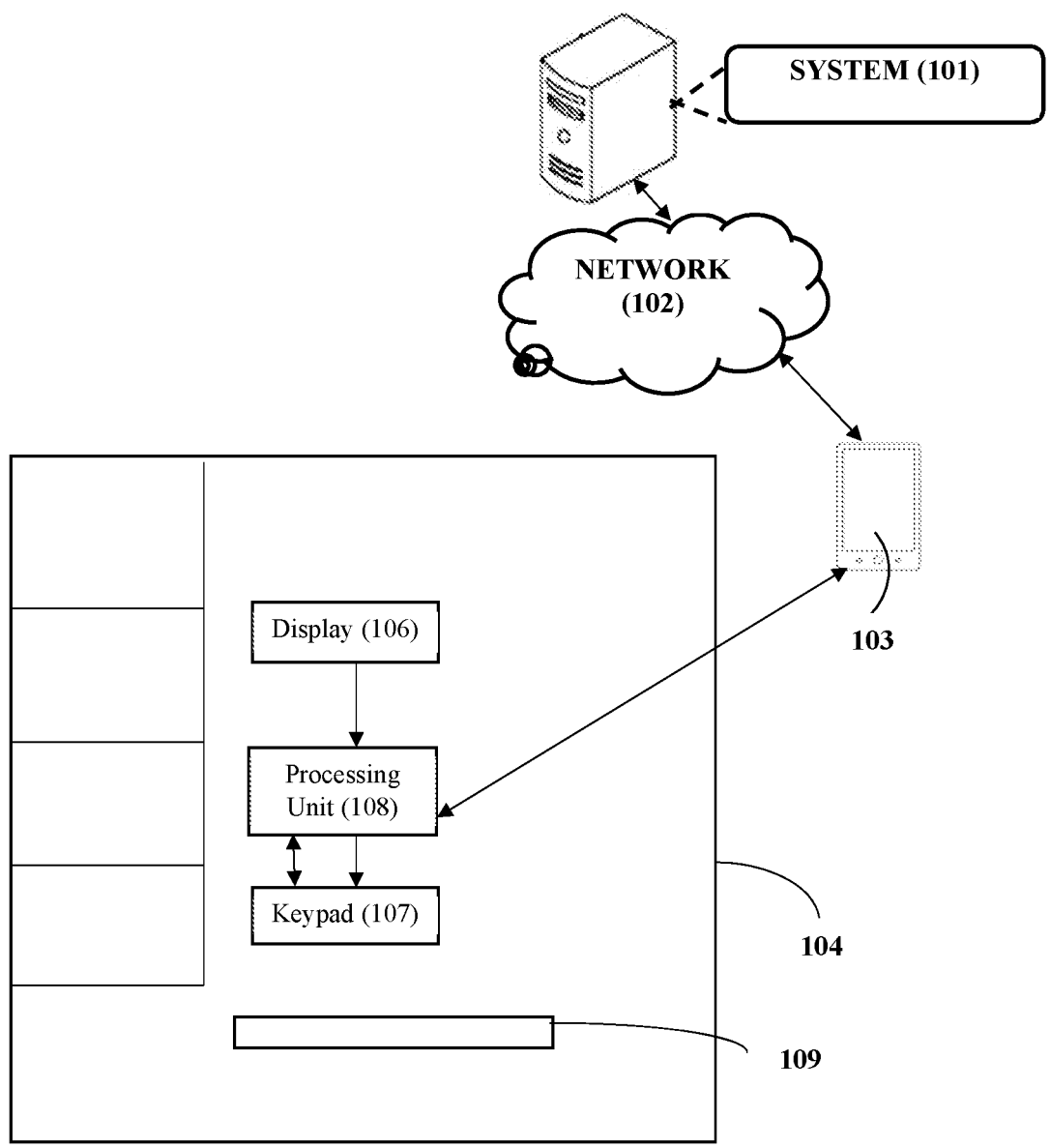
FIG. 6 illustrates an example of inventory management using a processing unit retrofitted with a vending device, in accordance with an embodiment of the present subject matter.

Now referring to FIG. 6, an example of inventory management using processing unit is illustrated. In one embodiment, the keypad 107 may be connected to the processing unit 108 through the keypad connector port. The processing unit 108 may be configured to freeze the keypad 107 until information is received from the user device 103. In one embodiment, the information may be received from the user device 103 after completion of electronic transaction associated the product(s) selected from the vending device using user device 103. After receiving the information, the processing unit 108 may release the keypad 107 in order to perform auto-pressing of the keys of the keypad. In one embodiment, the information may include a unique alphanumeric code generated by the system 101. In one embodiment, the processing unit 108 may be configured to perform tapping of the keys of the keypad 107. Further, the processing unit 108 may be configured to update the inventory using tapped vending data stored in the processing unit 108, at the time of subsequent electronic/cashless transaction associated with the vending device through the user device or operator device.

Figure 7:
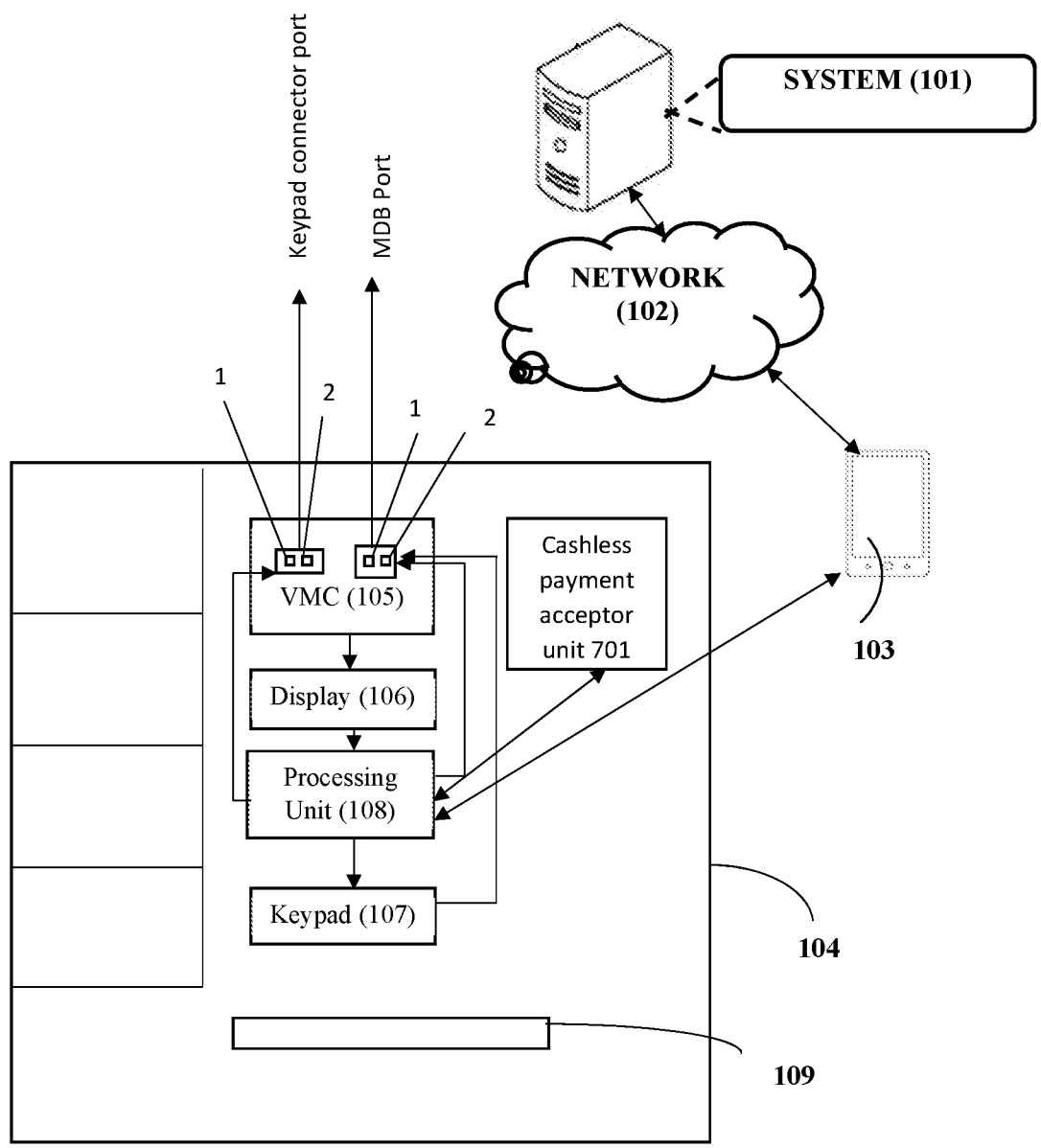
FIG. 7 illustrates an example of inventory management of the vending device via the processing unit wherein the processing unit is coupled with an existing and/or other cashless payment acceptor unit of the vending device, in accordance with an embodiment of the present subject matter.

Now referring to FIG. 7, an example of inventory management of the vending device via the processing unit wherein the processing unit coupled with an existing and/or other cashless payment acceptor unit of the vending device is illustrated. In one exemplary embodiment, the processing unit 108 may be electronically coupled with the existing and/or other cashless payment acceptor unit 701 of the vending device through UART port-1 (not shown in the figure). Further, the processing unit 108 may also connected to the VMC 105 through UART port-2 (not shown in the figure). In one embodiment, the keypad 107 may be electronically coupled with the VMC 105 via keypad connector port in order to receive vending data from the user. The VMC 105 may be configured to freeze the keypad 107 until the cashless payment acceptor unit 701 receives the payment from the user. In one exemplary embodiment, the existing and/or other cashless payment acceptor unit 701 may be a debit/credit card acceptor machine, a near field communication (NFC) contactless payment machine and a like. After receiving the payment, the processing unit 108 may indicate the credit of the payment to the VMC 105 through the MDB protocol. The VMC 105 may release the keypad in order to enable user/consumer to select product from vending device 104. Further, the VMC 105 may be configured to tap of the vending data entered by the user. The VMC 105 may transmit tapped data to the processing unit 108. In some embodiments, if the VMC 105 fails to tap the vending data, the processing unit 108 itself may tap the vending data entered by the user via a silicone film placed behind the keypad (not shown) as described above. Further, the processing unit 108 may be configured to update the inventory using tapped vending data stored in the processing unit 108, at the time of subsequent electronic/cashless transaction associated with the vending device through the consumer device or the operator device.

Still referring to FIG. 7, in a scenario wherein the VMC is not available in the vending device, then the processing unit 108 may be electronically coupled with the existing and/or other cashless payment acceptor unit of the vending device through UART port-1 (Not shown in the figure). In one embodiment, the keypad 107 may be electronically coupled with the processing unit 108 via keypad connector port in order to receive vending data from the user. The processing unit 108 may be configured to freeze the keypad 107 until the existing and/or other cashless payment acceptor unit receives the payment from the user. In one exemplary embodiment, the existing and/or other cashless payment acceptor unit may be a debit/credit card acceptor machine, a near field communication (NFC) contactless payment machine and a like. After receiving the payment, the processing unit 108 may release the keypad in order to enable user/consumer to select product from vending device 104. Further, the processing unit 108 may be configured to tap of the vending data entered by the user. Further, the processing unit 108 may be configured to update the inventory using tapped vending data stored in the processing unit 108, at the time of subsequent electronic/cashless transaction associated with the vending device through the user device or operator device. In one embodiment, the processing unit 108 may be configured to update the inventory when the vending device is communicatively coupled with the consumer device or the operator device. In one embodiment, the processing unit 108 may be configured to transmit tapped cash transaction to the system 101 through a user device 103 in order to update the inventory at the time of subsequent electronic/cashless transaction associated with the vending device.

Although implementations for vending device inventory management have been described in language specific to structural features and/or methods, it is to be understood that the appended claims are not necessarily limited to the specific features or methods described. Rather, the specific features and methods are disclosed as examples of implementations for vending device inventory management.

What is claimed is:

1. A vending device inventory management system, the system comprising:
  a processor coupled to a memory;
  a user mobile device;
  a vending device, remotely located from the processor, comprising a processing unit retrofitted with a vending machine controller (VMC), wherein the VMC is electronically coupled with a keypad via a keypad connector port-1 of the VMC and the processing unit is electronically coupled with the VMC via a keypad connector port-2 of the VMC;
    the processing unit, of the vending device, is configured to:

tap, by the processing unit, vending data associated with a cash transaction through the keypad connector port-2 of the VMC;

in response to tapping vending data associated with a cash transaction through the keypad connector port-2 of the VMC OR through the keypad connector port-1 of the VMC, store, by the processing unit, the tapped vending data in the processing unit;

tap, by the processing unit, vending data associated with a cashless transaction through the keypad connector port-2 of the VMC;

in response to tapping vending data associated with the cashless transaction through the keypad connector port-2 of the VMC, store, by the processing unit, the tapped vending data associated with the cashless transaction in the processing unit;

complete, by the processing unit, the transaction associated with the cash or cashless transaction from the user mobile device;

send, by the processing unit, the tapped vending data associated with the cash and cashless transaction to the user mobile device;

the user mobile device communicatively coupled with the vending device and the processor;

the user mobile device configured to:
receive, from the processing unit, the tapped vending data completed at the vending device associated with the cash or cashless transaction;

in response to receiving the tapped vending data completed at the vending device associated with the cash or cashless transaction, transmit, by the user mobile device, the received vending data to the processor;

the processor remotely located from the vending device;

the processor configured to execute programmed instructions stored in the memory to:

receive, by the processor, the tapped vending data from the user mobile device;

analyze, by the processor, the vending data received from the user mobile device associated to the cash transaction or the cashless transaction;

determine, by the processor, a list of one or more products successfully dispensed from the vending device, and a list of one or more products failed from being dispensed from the vending device;

update, by the processor, an inventory associated with the vending device, and recommend, by the processor, a product or combination of products for refilling of the vending device based upon analysis of the tapped vending data received from the user mobile device;

generate, by the processor, an updated planogram based on the updated inventory; and receive, by an operator device remotely located from the processor, the updated planogram along with the product or combination of products recommended, and display, in the operator device, the received updated planogram along with the product or combination of products recommended for enabling an operator to refill the one or more products in the vending device.

2. The system of the claim 1, wherein the user mobile device is configured to auto-pair with the processing unit of the vending device using a wireless communication protocol selected from a group comprising a Bluetooth communication protocol, a Near Field Communication (NFC), a Radio Frequency (RF) protocol, an infra-red (IR) protocol, and a ZigBee protocol.

3. The system of claim 1, wherein the updated planogram indicates a virtual image of number and arrangement of the all products in the shelves, racks or trays in the vending device.

4. The system of claim 1, wherein vending data associated to the cash transaction or the cashless transaction is analyzed in order to instantaneously initiate a refund after the failure of dispense of a product from the vending device.

5. The system of claim 1, wherein if a product is failed from being dispensed, the processor is further configured to execute a programmed instruction to generate and send an alert to the operator device to check and diagnose the components dispensing the product or change/replace the product itself on the said tray/rack.

6. The system of claim 1 further comprising enabling the user to capture, via the operator device, an image of the vending device after refilling of the vending device based on the updated planogram and the product or combination of products recommended.

7. The system of claim 1, wherein the vending device and the user mobile device are configured to provide voice enabled commands to enable function of the vending device or the user device.

8. The system of claim 1, wherein the processing unit is further configured for:
tapping of vending data associated to the cash transaction or the cashless transaction through the keypad connector port-2 of the VMC,
updating the inventory associated with the vending device based upon the tapping of the vending data, and
transmitting the inventory updated to the user mobile device and further to the system via the user mobile device.

9. The system of claim 1, wherein the processing unit is configured to perform tapping through a thin film of a silicon attached to the keypad.

10. A vending device inventory management method comprising:
tapping, by a processing unit of a vending device remotely located from a processor, vending data associated with a cash transaction through the keypad connector port-2 of the VMC; wherein the vending device comprises the processing unit retrofitted with a vending machine controller (VMC), wherein the VMC is electronically coupled with a keypad via a keypad connector port-1 of the VMC and the processing unit is electronically coupled with the VMC via a keypad connector port-2 of the VMC;

in response to tapping vending data associated with a cash transaction through the keypad connector port-2 of the VMC OR through the keypad connector port-1 of the VMC, storing, by the processing unit of the vending device, the tapped vending data in the processing unit of the vending device;

tapping, by the processing unit of the vending device, vending data associated with a cashless transaction through the keypad connector port-2 of the VMC;

in response to tapping vending data associated with the cashless transaction through the keypad connector port-2 of the VMC, storing, by the processing unit of the vending device, the tapped vending data associated with the cashless transaction in the processing unit of the vending device;

completing, by the processing unit of the vending device, the transaction associated with the cash or cashless transaction from a user mobile device;

sending, by the processing unit of the vending device, the tapped vending data associated with the cash and cashless transaction to the user mobile device;

receiving, by the user mobile device from the processing unit of the vending device, the tapped vending data completed at the vending device associated with the cash or cashless transaction; wherein the user mobile device communicatively coupled with the vending device and the processor;

in response to receiving the tapped vending data completed at the vending device associated with the cash or cashless transaction, transmitting, by the user mobile device, the received vending data to the processor;

receiving, by the processor remotely located from the vending device, the tapped vending data from the user mobile device;

analyzing, by the processor, the vending data received from the user mobile device associated to the cash transaction or the cashless transaction;

determining, by the processor, a list of one or more products successfully dispensed from the vending device, and a list of one or more products failed from being dispensed from the vending device;

updating, by the processor, an inventory associated with the vending device, and recommending, by the processor, a product or combination of products for refilling of the vending device based upon analysis of the tapped vending data received from the user mobile device;

generating, by the processor, an updated planogram based on the updated inventory; and receiving, by an operator device remotely located from the processor, the updated planogram along with the product or combination of products recommended, and display, in the operator device, the received updated planogram along with the product or combination of products recommended for enabling an operator to refill the one or more products in the vending device.

11. The method of claim 10, wherein the analysis of the vending data associated to the cash transaction or cashless transaction is further used to instantaneously initiate a refund after the failure of dispense of a product from the vending device.

12. The method of claim 10 further comprising enabling the operator device to capture an image of the vending device after refilling of the vending device based on the updated planogram and the product or combination of products recommended in order to update the inventory.

13. The method of claim 10 further comprising enabling the processing unit to:
  tap vending data associated to the cash transaction or the cashless transaction through the keypad connector port-2 of the VMC,
  update the inventory associated with the vending device based upon the tapping of vending data and
  transmit the inventory updated to the user device and further to a system via the user device.

14. The method of claim 13, wherein the processing unit is further configured to perform tapping through a thin film of a silicon attached to the keypad.

* * * * *